M. WEIXLER.
BELT FASTENER.
APPLICATION FILED SEPT. 9, 1909.
965,778.
Patented July 26, 1910.
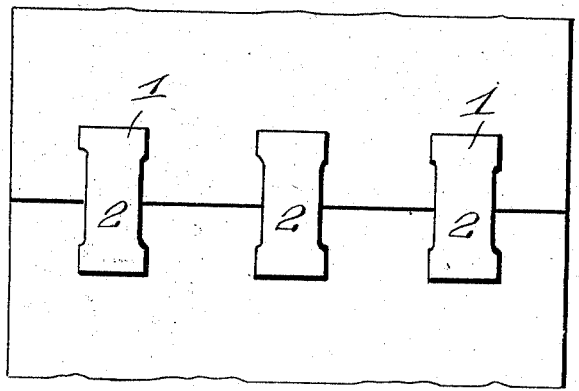
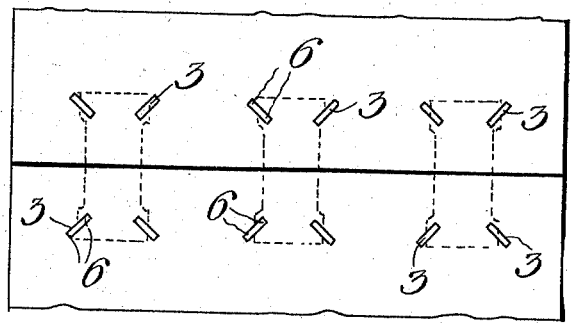
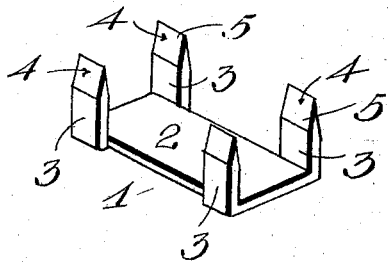
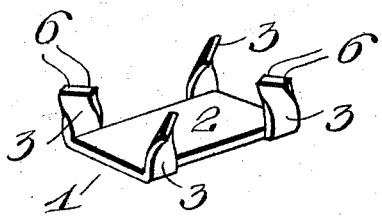
Witnesses
Inventor
M. Weixler
by H. B. Willson & Co.
Attorneys

UNITED STATES PATENT OFFICE.

MATHIAS WEIXLER, OF LOUISVILLE, KENTUCKY.

BELT-FASTENER.

965,778.  Specification of Letters Patent.  Patented July 26, 1910.

Application filed September 9, 1909. Serial No. 516,873.

*To all whom it may concern:*

Be it known that I, MATHIAS WEIXLER, a citizen of the United States, residing at Louisville, in the county of Jefferson and State of Kentucky, have invented certain new and useful Improvements in Belt-Fasteners; and I do declare the following to be a full, clear, and exact description of the invention, such as will enable others skilled in the art to which it appertains to make and use the same.

This invention relates to improvements in belt fasteners.

In the drawings, Figure 1 is a plan view showing the meeting ends of a belt connected by means of my improved fasteners; Fig. 2 is a reverse plan view of Fig. 1; Fig. 3 is a perspective view of the fastener before being engaged with the belt, and Fig. 4 is a similar view of the fastening showing how the fastening prongs appear after having been twisted off.

Referring to the drawings for a more particular description of the invention, 1 indicates the fastener which is cut or stamped from a sheet of metal and consists of a flat body portion 2, provided at either end with a pair of laterally projecting belt engaging prongs 3, the outer ends of which are beveled on opposite sides as at 4, so that they may be easily forced through the meeting edges or ends of a belt. These fasteners are arranged longitudinally of the belt so that when the prongs are inserted, the belt will be weakened to a much less extent than were the fasteners arranged crosswise of the belt. Furthermore, by inserting the prongs through the belt lengthwise, the strain is also applied to the edges of the prongs instead of transversely thereof, thus decreasing the danger of the prongs being turned out and pulled out of engagement with the belt.

After the prongs have been inserted through the belt, the inner projecting portions 5, thereof are twisted and cut off by a suitable device. By twisting off the projecting ends of the prongs of the fastener, the corners 6 thereof are disposed at an angle with the inner ends of the prongs, whereby the fasteners are securely held against disengagement with the meeting edges of the belt. Furthermore, by twisting off the projecting ends of the prongs, the inner ends thereof lie flush with the inner faces of the belt and the belt may be used on wooden pulleys without cutting the peripheries thereof, or it may be used on metallic pulleys without making a "clicking" sound.

It will be noticed that the prongs are so twisted off that the outer ends of each pair of prongs at diagonally opposite corners of the body portion are disposed approximately at right angles with the outer ends of the other pair of prongs, whereby the prongs of the fastener are more securely or effectually held against disengagement with the belt.

From the foregoing description, taken in connection with the accompanying drawing, the construction and operation of the invention will be readily understood without requiring a more extended explanation.

Various changes in the form, proportion and the minor details of construction may be resorted to without departing from the principle or sacrificing any of the advantages of this invention as defined in the appended claim.

Having thus described my invention, what I claim is:—

A belt joint comprising in combination the meeting ends of the belt and a belt fastener, the fastener comprising a flat body portion provided at each corner with a right angularly bent prong which projects through the meeting ends of the belt, the said portions having their projecting ends twisted at an angle with the inner portions thereof and cut off flush with the inner faces of the meeting ends of the belt, the prongs of the belt being so twisted that the outer ends of each pair of prongs at diagonally opposite corners of the body portion are disposed approximately at right angles with the outer ends of the other pair of prongs, whereby the engagement between the prongs and meeting ends of the belt is more effectual.

In testimony whereof I have hereunto set my hand in presence of two subscribing witnesses.

MATHIAS WEIXLER.

Witnesses:
JOHN ZIEGLER,
GEO. J. EGNER.